(12) United States Patent
Cho et al.

(10) Patent No.: US 8,377,842 B2
(45) Date of Patent: Feb. 19, 2013

(54) ADSORBENT FOR SELECTIVE ADSORPTION OF CARBON MONOXIDE AND PROCESS FOR PREPARATION THEREOF

(75) Inventors: Soon Haeng Cho, Daejeon (KR); Sodankoor Garadi Thirumaleshwara Bhat, Daejeon (KR); Sang Sup Han, Daejon (KR); Jong Ho Park, Daejeon (KR); Jong Nam Kim, Daejeon (KR); Heon Jung, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 603 days.

(21) Appl. No.: 12/602,841

(22) PCT Filed: Jun. 13, 2007

(86) PCT No.: PCT/KR2007/002851
§ 371 (c)(1),
(2), (4) Date: Dec. 3, 2009

(87) PCT Pub. No.: WO2008/150041
PCT Pub. Date: Dec. 11, 2008

(65) Prior Publication Data
US 2010/0204043 A1 Aug. 12, 2010

(30) Foreign Application Priority Data
Jun. 4, 2007 (KR) .................. 10-2007-0054275

(51) Int. Cl.
*B01J 20/02* (2006.01)
*B01D 53/62* (2006.01)

(52) U.S. Cl. ........... 502/400; 95/140; 502/411; 502/415

(58) Field of Classification Search .......... 423/400–415, 423/247; 502/400, 411, 415; 95/140
See application file for complete search history.

(56) References Cited

U.S. PATENT DOCUMENTS

| | | | |
|---|---|---|---|
| 2,760,908 A * | 8/1956 | Roach et al. ............... 208/225 |
| 3,575,885 A * | 4/1971 | Hunter et al. ............... 502/402 |
| 3,789,106 A | 1/1974 | Hay |
| 4,019,879 A * | 4/1977 | Rabo et al. ............... 95/140 |
| 4,470,829 A | 9/1984 | Hirai et al. |
| 4,587,114 A * | 5/1986 | Hirai et al. ............... 423/247 |
| 4,713,090 A | 12/1987 | Yokoe et al. |
| 4,914,076 A * | 4/1990 | Tsuji et al. ............... 502/407 |
| 4,917,711 A | 4/1990 | Xie et al. |
| 5,126,310 A * | 6/1992 | Golden et al. ............... 502/417 |
| 5,175,137 A | 12/1992 | Golden et al. |
| 5,258,571 A | 11/1993 | Golden et al. |
| 5,529,970 A * | 6/1996 | Peng ............... 502/400 |
| 6,060,032 A * | 5/2000 | Hable et al. ............... 423/210 |
| 6,491,740 B1 * | 12/2002 | Wang et al. ............... 95/90 |
| 7,560,413 B2 * | 7/2009 | Lok ............... 502/346 |

FOREIGN PATENT DOCUMENTS

| | | | |
|---|---|---|---|
| EP | 0472180 A2 | | 2/1992 |
| JP | 60-90041 | * | 5/1985 |
| JP | 61-263637 | * | 11/1986 |
| JP | 62095136 A | | 5/1987 |
| JP | 63004845 A | | 1/1988 |
| JP | 1997-290149 A | | 11/1997 |
| JP | 1998-180091 A | | 7/1998 |
| JP | 1999-037993 A | | 2/1999 |
| JP | 2005-289761 A | | 10/2005 |

OTHER PUBLICATIONS

International Search Report for PCT/KR2007/002851.
Hidefumi Hirai et al., "Copper(I) chloride-ethanediamine complex supported on silica gel as adsorbent for carbon monoxide", Rective & Functional Polymers, Oct. 21, 1997, 37 (1998) pp. 199-212, Elsevier Science B.V., Tokyo, Japan.
KIPO Notice of Allowance for Korean Patent Application No. 10-2007-0054275 which corresponds to the above-referenced application.
Related Art Search Report.

\* cited by examiner

*Primary Examiner* — Wayne Langel
(74) *Attorney, Agent, or Firm* — LRK Patent Law Firm

(57) ABSTRACT

The present invention relates to an adsorbent for separating carbon monoxide from a gas mixture including hydrogen gas and a method of preparing the same. The adsorbent for selectively separating monoxide includes a solid material, which is a solid support impregnated and dispersed with a cuprous salt by bringing the solid support into contact with a cuprous salt solution stabilized by dissolving a cuprous salt or a cuprous salt mixture in a solvent. The adsorbent is advantageous in that the selectivity for carbon monoxide is improved, so that the amount of carbon monoxide included in the gas mixture is decreased to infinitesimal quantities, thereby producing high-purity hydrogen products.

18 Claims, No Drawings

ADSORBENT FOR SELECTIVE ADSORPTION OF CARBON MONOXIDE AND PROCESS FOR PREPARATION THEREOF

TECHNICAL FIELD

The present invention relates to an adsorbent for separating carbon monoxide from a gas mixture including hydrogen gas and a method of preparing the same, and, more particularly, to an adsorbent for selectively separating carbon monoxide from a gas mixture, by which the selectivity for carbon monoxide is improved at the time of selectively adsorbing and separating carbon monoxide in a gas mixture using a pressure swing adsorption (PSA) process, so that the amount of carbon monoxide included in the gas mixture is decreased to infinitesimal quantities, thereby producing high-purity hydrogen products, and to a method of preparing the adsorbent.

BACKGROUND ART

Various technologies for selectively adsorbing and separating carbon monoxide (CO) from a gas mixture have been researched ever since the fact that carbon monoxide can be absorbed using an ammonium chloride solution became known in the chemical technology field.

In order to more effectively separate carbon monoxide, various metals, such as nickel, cobalt, copper, silver, and the like, may be combined with solid materials. Among them, an adsorbent including copper compounds is known to most effectively adsorb carbon monoxide. That is, in industrial fields, carbon monoxide is collected and chemically changed using the solid material including copper as a catalyst or an adsorbent. However, since cuprous compounds are not easily dissolved even in a large amount of a solvent, cupric compounds are combined with the solid material, and then come into contact with a reductant, such as hydrogen or carbon monoxide, under suitable conditions, so that the cupric compounds are converted into cuprous ions ($Cu^+$) or copper metal (Cu), thereby improving the selectivity for carbon monoxide.

In addition to this, since the cuprous compounds do not readily dissolve in most solvents, it is not easy to uniformly disperse a desired amount of cuprous compound in a solid material.

Methods of dispersing a cuprous compound in a solid material include a method of depositing an aqueous cupric salt on a solid material and then reducing the deposited cupric salt to a cuprous state, a method of physically mixing a solid support with a solid cuprous salt to form a mixture and then heat-treating the mixture at high temperature, a method of vaporizing a cuprous salt and then depositing the vaporized cuprous salt on the inner surface of a solid support, and other methods.

In this case, hydrogen, carbon monoxide, a tin compound, iron compounds, cobalt (II), dicarboxylate, reducing sugar, and the like are used in order to reduce the cupric salt to a cuprous state.

Hereinafter, the aforementioned methods of dispersing a cuprous compound in a solid material will be briefly described with reference to prior patents.

First, it was disclosed in U.S. Pat. No. 3,789,106 that a zeolite adsorbent or a mordenite adsorbent, which is prepared by exchanging sodium ions for copper ions or other metal ions, is used in order to adsorb carbon monoxide. The main object of such an adsorbent is to remove an infinitesimal amount of carbon monoxide present in a gas mixture. This patent is characterized in that the zeolite adsorbent or mordenite adsorbent is prepared by exchanging sodium ions for copper ions in a mordenite molecular sieve structure.

Further, U.S. Pat. No. 4,019,879 discloses a method of adsorbing and separating carbon monoxide (CO) from gas streams using an adsorbent formed of zeolitic molecular sieves exchanged with cuprous cations. In this patent, the adsorbent is prepared by impregnating zeolitic molecular sieves with cupric ions and then reducing the cupric ions to cuprous ions during an ion-exchange procedure.

Further, U.S. Pat. No. 4,470,829 discloses an adsorbent for selectively adsorbing carbon monoxide, comprising copper halide, aluminum halide, and polystyrene or its derivatives; and an adsorbent for selectively adsorbing carbon monoxide, comprising copper halide, aluminum halide, and activated carbon or graphite. Such an adsorbent is prepared by mixing the three components in a hydrocarbon solvent and then removing the hydrocarbon solvent.

Further, it was disclosed in U.S. Pat. No. 4,587,114 that an adsorbent for selectively adsorbing carbon monoxide can be prepared by impregnating a carbon support with a cuprous compound or a cupric compound and then removing the solvent therefrom. Here, the solvent is selected from among water, aqueous hydrochloric acid or ammonium formate, primary or secondary alcohols having 1 to 7 carbon atoms, acetone, ethyl acetate, formic acid, acetic acid, benzene, toluene, propionitrile, acetonitrile, aqueous ammonia, and the like.

Further, U.S. Pat. No. 4,713,090 discloses an adsorbent for selectively adsorbing carbon monoxide, comprising a composite support composed of silica and/or alumina and activated carbon, and a copper compound supported on the composite support. Here, the solvent, used in the preparation of the adsorbent, is selected from among aqueous ammoniacal formic acid, aqueous ammonia, nitrogen containing compounds, such as propionitrile, acetonitrile, diethylamine, dimethylformamide, N-methylpyrrolidone, etc.

Further, U.S. Pat. No. 4,914,076 discloses an adsorbent for selectively adsorbing carbon monoxide, prepared by impregnating an alumina or silica-alumina carrier with a cupric salt using a solvent containing a reducing agent and then removing the solvent. In this patent, the cupric salt is reduced to a cuprous salt, and water containing a reducing agent is used as the solvent in order to impregnate an alumina or silica-alumina carrier with a cupric salt. In addition, formalin, formic acid, alcohols and other compounds are used as the solvent. As the reducing agent, low atomic valence metal salts, such as iron compounds, tin compounds, titanium compounds, chromium compounds, and the like, aldehydes, saccharides, formic acid, oxalic acid, and other compounds are used.

Further, U.S. Pat. No. 4,917,711 discloses a method of preparing an adsorbent for selectively adsorbing carbon monoxide by mixing a support selected from among zeolite, alumina, silica gel, aluminosilicate, aluminophosphate and a combination thereof with a cuprous compound in a solid form or by mixing them with a solvent. Here, the solvent is selected from among water, an aqueous hydrochloric acid-containing solution, primary or secondary alcohols having 1 to 7 carbon atoms, acetone, ethyl acetate, hydrocarbons having 4 to 7 carbon atoms, propionitrile and acetonitrile, and the cupric compound, supported on the support, is converted into a cuprous compound.

Furthermore, U.S. Pat. Nos. 5,175,137, 5,126,310, and 5,258,571 disclose adsorbents for selectively adsorbing carbon monoxide by uniformly dispersing copper on a support using a dispersant, for example, ammonium citrate.

Meanwhile, in industrial fields, hydrogen is produced by reforming natural gas, naphtha and other hydrocarbon sources with steam or recovering hydrogen from various gases generated from petrochemical plants.

Raw materials, which are introduced into a hydrogen refining process necessarily performed at the time of producing hydrogen, include impurities, such as carbon dioxide, nitrogen, methane, water, carbon monoxide, and the like. Among the impurities, carbon monoxide is difficult to remove.

In order to remove the impurities, conventionally, activated carbon and zeolite 5A are used while using a pressure swing adsorption (PSA) process, and, particularly, the zeolite 5A is used as an adsorbent for selectively and reversibly adsorbing carbon monoxide.

However, the zeolite 5A adsorbent is problematic in that, since it has strong adsorptivity for carbon dioxide and water, its capacity to adsorb carbon monoxide is decreased when carbon dioxide and water are adsorbed on the zeolite 5A adsorbent, and thus the hydrogen products, produced using the zeolite 5A adsorbent through a pressure swing adsorption (PSA) process, cannot help including a large amount of carbon monoxide.

Therefore, in order to solve the problem, a pressure swing adsorption tower must be filled with an excessive amount of the zeolite 5A adsorbent.

DISCLOSURE OF INVENTION

Technical Problem

Accordingly, the present invention has been made keeping in mind the above problems occurring in the prior art, and an object of the present invention is to provide an adsorbent for selectively separating carbon monoxide from a gas mixture, by which the selectivity for carbon monoxide is improved at the time of selectively adsorbing and separating carbon monoxide in a gas mixture using a pressure swing adsorption (PSA) process, so that the amount of carbon monoxide included in the gas mixture is decreased to infinitesimal quantities, thereby producing high-purity hydrogen products.

Another object of the present invention is to provide an adsorbent for selectively separating carbon monoxide from a gas mixture, by which an aqueous ammonia solution containing cuprous chloride, stabilized using specific organic compounds or inorganic compounds, comes into contact with a porous solid support, thus easily dispersing a cuprous salt on the surface of the solid support.

A further object of the present invention is to provide an adsorbent for selectively separating carbon monoxide from a gas mixture, by which carbon monoxide can be easily desorbed from an adsorbent by increasing the partial pressure of the carbon monoxide adsorbed on the adsorbent or decreasing the temperature thereof, thus maintaining the reproductive property of the adsorbent.

BEST MODE FOR CARRYING OUT THE INVENTION

In order to accomplish the above objects, an aspect of the present invention provides an adsorbent for selectively separating carbon monoxide, comprising a solid material, which is a solid support impregnated and dispersed with a cuprous salt, by bringing the solid support into contact with a cuprous salt solution, stabilized by dissolving a cuprous salt or a cuprous salt mixture in a solvent.

The cuprous salt is one selected from among cuprous halide, cuprous acetate, and mixtures thereof.

Further, the solvent is any one selected from among water, ethanol, ethyl acetate, acetone, aqueous ammonia solution, and mixtures thereof.

The solid support, which is an inorganic material, is any one selected from among porous alumina, silica, aluminosilicate, and compounds thereof. Preferably, the solid support is a porous alumina support.

The porous solid support is formed by combining alumina with silica.

Further, the adsorbent stabilizes the cuprous salt solution in a cuprous ion state by mixing an additive with the cuprous salt solution before the solid support comes into contact with the cuprous salt solution.

In this case, the additive functions as a reductant and a stabilizer, is an oxidizing substance containing an alkali metal salt, and includes an organic compound and an inorganic compound. The organic compound is glucose or formaldehyde, and the inorganic compound is any one selected from among an iron salt, a tin salt and iron sulfate.

Further, the molar ratio of the cuprous compound to the glucose or formaldehyde, which is the organic compound serving as the stabilizer, is 5~20.

Further, the alkali metal salt includes lithium halide, sodium halide, potassium halide, lithium carbonate, sodium carbonate, and potassium carbonate.

Meanwhile, the solid support has a granular, cylindrical or spherical form.

The adsorbent of the present invention is prepared by impregnating the solid support with a cuprous compound, and is characterized in that the adsorption amount of carbon monoxide is increased, but the adsorption amount of carbon dioxide, nitrogen, methane or hydrogen is rapidly decreased.

In order to accomplish the above objects, another aspect of the present invention provides a method of preparing an adsorbent for selectively separating carbon monoxide, comprising: dissolving a cuprous salt or a cuprous salt mixture in a solvent to form a cuprous salt solution; mixing the cuprous salt solution with an additive containing an alkali metal salt to stabilize the cuprous salt solution in a cuprous ion state; and bringing a solid support into contact with the cuprous salt solution to impregnate the solid support with the cuprous salt or cuprous salt mixture.

In this case, the method of preparing an adsorbent for selectively separating carbon monoxide further comprises, after the dissolving a cuprous salt in a solvent to form a cuprous salt solution: stirring the cuprous salt solution for 1~8 hours.

The cuprous salt is one selected from among cuprous halide, cuprous acetate, and mixtures thereof, and the solvent is any one selected from among water, ethanol, ethyl acetate, acetone, aqueous ammonia solution, and mixtures thereof. The cuprous salt solution is formed by dissolving the cuprous salt in the solvent. The cuprous salt solution is stabilized using an oxidizing substance containing an alkali metal salt, which is an additive, when the cuprous salt is dissolved in the solvent.

At this time, the solid support, formed of alumina, silica, aluminosilicate or a combination thereof, comes into contact with the stabilized cuprous salt solution to impregnate the solid support with the cuprous salt.

Here, the solid support includes an inorganic material, and has a granular, cylindrical or spherical form. The solid support has a surface area of 100~600 $m^2/g$, and preferably 200~400 $m^2/g$.

Further, the solid support has a pore diameter of 10~300, preferably 20~80, and more preferably 35~50 Å Åhe solid support impregnated with the cuprous salt or cuprous salt mixture is exposed to a nitrogen atmosphere at a predetermined temperature for at least 2~24 hours, and preferably 8 hours. In this case, the temperature of the nitrogen atmosphere is maintained at 20~100° C., preferably 50~90° C., and more preferably 80° C.

Subsequently, the solid support is heat-treated while vaporizing and drying the remaining cuprous salt solution, which is in a state in which it is in contact with the solid support, by heating the cuprous salt solution under a nitrogen purge.

Finally, the solid support is heated in a furnace to a temperature of 80~400° C., preferably 100~200° C., and more preferably at least 100° C.

The heating of the solid support is performed by purging with an inert gas, such as nitrogen, or is performed in a vacuum state.

The adsorption amounts of carbon monoxide, carbon dioxide, methane, nitrogen and hydrogen are measured using the solid material, that is, adsorbent prepared as above while changing the pressure of a gas mixture.

Meanwhile, carbon monoxide adsorbed in the adsorbent can be desorbed from the adsorbent by decreasing the partial pressure of carbon monoxide or increasing the temperature. In this case, carbon monoxide can also be desorbed from the adsorbent by decreasing the partial pressure of carbon monoxide and simultaneously increasing the temperature.

Since the adsorbent, from which carbon monoxide is desorbed, can adsorb carbon monoxide again, as described above, the adsorbent becomes a solid material which can selectively remove carbon monoxide from a gas mixture containing various impurities, and thus its lifespan is increased due to the physical reproductive performance of the adsorbent.

Since the adsorption heat for carbon monoxide of the adsorbent prepared through the above processes is greater than that of conventional zeolite 5A or zeolite 13X, and the adsorption heat for methane or carbon dioxide of the adsorbent is less than that of conventional zeolite 5A or zeolite 13X, it can be seen that the capacity for adsorbing carbon monoxide is improved.

Therefore, the present invention is characterized in that the adsorbent, having improved capacity for selectively adsorbing carbon monoxide compared to that of a conventional zeolite 5A or zeolite 13X adsorbent, is prepared.

Mode for the Invention

Hereinafter, various methods of preparing the adsorbent of the present invention will be described in detail with reference to the following Examples.

A better understanding of the present invention may be obtained through the following examples which are set forth to illustrate, but are not to be construed as the limit of the present invention.

Example 1

2.0 g of cuprous chloride and 0.50 g of glucose were put into a flask, and then 15 ml of an aqueous ammonia solution was added to the flask to form a mixed solution, and then the mixed solution was stirred. Subsequently, alumina for drying (for example, Selexorb CDX, commercially available from Alcoa Corp.) was dried in an oven at a temperature of 100° C. for 2 hours, and then 20 g of the dried alumina was added to the mixed solution in the flask and was then stirred for 20 minutes. Thereafter, the resulting product was dried under a nitrogen atmosphere at a temperature of 100° C. for 2 hours. Before the resulting product was subjected to an adsorption test, it was heated to a temperature of 200° C. for 2 hours at atmospheric pressure or lower under a nitrogen purge, or was heated for 2 hours in a vacuum state, thereby preparing an adsorbent. The amount of carbon monoxide adsorbed on the adsorbent prepared through the above processes was 0.50 mmole/g at a pressure of 185 torr and a temperature of 25° C., and was 0.70 mmole/g at a pressure of 687 torr and a temperature of 25° C.

Example 2

25 ml of an aqueous ammonia solution and 1.5 g of glucose were put into a beaker and stirred, and then 6.0 g of cuprous chloride was added to the beaker and further stirred to form a mixed solution. Subsequently, 30 g of alumina for drying (Selexorb CDX), dried at 100° C., was added to the mixed solution in the beaker and was then stirred for 1 hour. The beaker including the resulting product was placed in an electric heater or a thermostat bath, which was maintained at 60° C., and then the resulting product was purged with nitrogen until water was removed therefrom. The resulting product, from which the water was removed, was put into an oven, and was then dried at a temperature of 120° C. under a nitrogen purge, thereby preparing an adsorbent. Before the measurement of the adsorption amount, the adsorbent was finally activated at a temperature of 180~200° C. in a vacuum state or under a nitrogen purge. The amount of carbon monoxide adsorbed on this adsorbent was 1.0 mmole/g at a pressure of 700 torr and a temperature of 25° C.

Comparative Example 1

An adsorbent was prepared under the same conditions as in Example 2, except that glucose was not used. The amount of carbon monoxide adsorbed on the adsorbent prepared in this way was 0.45 mmole/g at a pressure of 700 torr and a temperature of 25° C.

Comparative Example 2

The amounts of carbon monoxide, carbon dioxide, methane and hydrogen adsorbed on the adsorbent prepared in Example 2 were measured. The adsorption amounts of carbon monoxide, carbon dioxide, methane and hydrogen were 1.0 mmole/g, 0.4 mmole/g, 0.07 mmole/g, and 0.03 mmole/g at a pressure of 760 torr and a temperature of 25° C., respectively.

Comparative Example 3

An adsorbent was prepared using the same method as in Example 2, except that 3.0 g of $FeSO_4$ was mixed with 6.0 g of CuCl to form a mixture, and then the mixture was dissolved in 25 ml of an aqueous ammonia solution. The amount of carbon monoxide adsorbed on the adsorbent prepared in this way was 0.9 mmole/g at a pressure of 745 torr and a temperature of 25° C.

Example 3

83 ml of an aqueous ammonia solution and 5.0 g of glucose were put into a 500 ml beaker and stirred, and then 20.0 g of cuprous chloride was added to the beaker and further stirred to form a mixed solution. Subsequently, 100 g of alumina (Selexorb CDX), dried at 100° C. for 2 hours, was added to the mixed solution in the beaker and was then stirred for 1 hour. The beaker including the stirred mixed solution was placed in an electric heater or a thermostat bath, which was maintained at 60° C., and then the mixed solution was primarily dried under a nitrogen purge until the water disappeared to form a solid material. Thereafter, the solid material was put into an oven, and was then secondarily dried at a temperature of 120° C. under a nitrogen purge, thereby preparing an adsorbent. Before the measurement of the adsorption amount, the adsorbent was finally activated at a temperature of 180~200° C. in a vacuum state or under a nitrogen purge. The amount of carbon monoxide adsorbed on this adsorbent was 1.0 mmole/g at a pressure of 700 torr and a temperature of 25° C.

Example 4

83 ml of an aqueous ammonia solution and 5.0 g of glucose were put into a 500 ml beaker and stirred, and then 20.0 g of cuprous chloride was added to the beaker and further stirred to form a mixed solution. Subsequently, 100 g of alumina (Selexorb CDX), dried at 100° C. for 2 hours, was added to the mixed solution in the beaker, and the mixed solution was then stirred for 1 hour. The beaker including the stirred mixed solution was placed in an electric heater or a thermostat bath, which was maintained at 60° C., and then the mixed solution was primarily dried under a nitrogen purge until water disappeared to form a solid material. Thereafter, the primarily-dried solid material was put into an oven, and was then secondarily dried at a temperature of 300° C. for 2 hours in a vacuum state, thereby preparing an adsorbent. The amount of carbon monoxide adsorbed on this adsorbent was 1.2 mmole/g at a pressure of 1 atm and a temperature of 25° C.

Example 5

82.2 g of ethyl alcohol and 106.9 g of water were put into a 600 ml beaker, and then 11.2 g of dodecylamine was added to the beaker and dissolved to form a solution. Subsequently, 41.8 g of tetraethyl orthosilicate (TEOS) was dropped onto the solution and simultaneously stirred at room temperature for 4 hours to form a mixed solution. The mixed solution was left for 24 hours, and was then filtered using a 50% aqueous alcohol solution three times. The resulting product was dried in an oven, and was then calcined at a temperature of 600° C. for 4 hours. The mesoporous silica particle, prepared through such processes, had a surface area of 1268 m2/g, a pore volume of 1.29 ml/g and an average pore diameter of 60 Å 2.0 g of cuprous chloride and 0.3 g of glucose were mixed with 6 ml of an aqueous ammonia solution, and then 3 g of the silica was added thereto, and the mixed solution was stirred for 1 hour to form a mixed solution. Then the mixed solution was intermittently stirred for 2 hours. This mixed solution was dried at a temperature of 180~200° C. under a nitrogen purge, and was then heated in an electric furnace to a temperature of 120° C. for 2 hours under a nitrogen atmosphere, thereby preparing an adsorbent. The amount of carbon monoxide adsorbed on the adsorbent prepared in this way was 0.4 mmole/g at a pressure of 100 torr and a temperature of 25° C.

Example 6

83 ml of an aqueous ammonia solution and 5.0 g of glucose were put into a 500 ml beaker and stirred, and then 20.0 g of cuprous chloride was added to the beaker and further stirred to form a mixed solution. Subsequently, silica-alumina gel (ALSG0525) was dried at a temperature of 100° C. for 2 hours, and then 100 g of the dried silica-alumina gel (ALSG0525) was added to the mixed solution in the beaker and was then stirred for 1 hour. The beaker including the stirred mixed solution was placed in an electric heater or a thermostat bath, which was maintained at 60° C., and then the mixed solution was primarily dried until water disappeared under a nitrogen purge to form a solid material. Thereafter, the primarily-dried solid material was put into an oven, and was then secondarily dried at a temperature of 120° C. under a nitrogen purge, thereby preparing an adsorbent. Before the measurement of the adsorption amount, the adsorbent was finally activated at a temperature of 180~200° C. in a vacuum state or under a nitrogen purge. The amount of carbon monoxide adsorbed on this adsorbent was 1.0 mmole/g at a pressure of 750 torr and a temperature of 25° C.

Example 7

39 g of aluminum iso-propoxide and 30 g of glucose were put into a flask, and then 480 g of deionized water was added to the beaker and the mixture was rapidly stirred to form a mixed solution. Subsequently, diluted nitric acid (0.1 M) was added dropwise to the mixed solution until the mixed solution had a pH of 5.0. Subsequently, the mixed solution was left for 12 hours, and was then dried at a temperature of 80~100° C. The dried product thereof was further calcined at a temperature of 600° C. to form a solid material. Subsequently, 3.6 g of the solid material was mixed with a solution including 3.0 ml of an aqueous ammonia solution, 0.18 g of glucose and 0.73 g of cuprous chloride, and the mixed solution was then stirred for 20 minutes. The resulting product was dried at a temperature of 80° C. for 2 hours under a nitrogen purge, and was then heated in an oven to a temperature of 120° C. for 2 hours under a nitrogen atmosphere, thereby preparing an adsorbent. The amount of carbon monoxide adsorbed on the adsorbent prepared in this way was 1.1 mmole/g at a pressure of 750 torr and a temperature of 25° C. After the adsorbent reached adsorption equilibrium through contact between the adsorbent and carbon monoxide, carbon monoxide was desorbed from the adsorbent in a vacuum at a temperature of 25° C., and thus the adsorbent was regenerated. The adsorption amount of carbon monoxide was measured using the regenerated adsorbent, and, as a result, the amount of carbon monoxide adsorbed on this regenerated adsorbent was 1.0 mmole/g.

Example 8

25 ml of an aqueous ammonia solution and 1.5 g of glucose were put into a 500 ml beaker and stirred, and then 6.0 g of cuprous chloride was added to the beaker and further stirred to form a mixed solution. Subsequently, spherical alumina (SASOL18210) was dried at a temperature of 100° C., and then 100 g of the dried spherical alumina (SASOL18210) was added to the mixed solution in the beaker and was then stirred for 1 hour. The beaker including the resulting product was placed in an electric heater or a thermostat bath, which was maintained at 60° C., and then the resulting product was purged with nitrogen until the water was removed therefrom. Thereafter, the resulting product, from which the water had been removed, was put into an oven, and was then dried at a temperature of 120° C. under a nitrogen purge, thereby preparing an adsorbent. Before the measurement of the adsorption amount, the adsorbent was finally activated at a temperature of 180~200° C. in a vacuum state or under a nitrogen purge. The amount of carbon monoxide adsorbed on this adsorbent was 0.8 mmole/g at a pressure of 750 torr and a temperature of 25° C. Thereafter, this adsorbent was treated at a temperature of 40° C. for 2 hours in a vacuum state. The amount of carbon monoxide adsorbed on this adsorbent was 0.76 mmole/g at a pressure of 750 torr and a temperature of 25° C. Thereafter, this adsorbent was treated at a temperature of 25° C. for 2 hours in a vacuum state. The amount of carbon monoxide adsorbed on this adsorbent was 0.70 mmole/g. Thereafter, this adsorbent was treated at a temperature of 120° C. for 2 hours under a nitrogen atmosphere. The amount of carbon monoxide adsorbed on this adsorbent was 0.80 mmole/g at a pressure of 750 torr and a temperature of 25° C.

Meanwhile, the adsorption amounts of methane, carbon dioxide and carbon monoxide of the adsorbent prepared in Example 2 were measured depending on the change in temperature, and the adsorption heat of the adsorbent was obtained using these adsorption amount data, and this adsorption heat of the adsorbent was compared with those of zeolite 13X and zeolite 5A, which are conventional adsorbents. The results thereof are given in Table 1.

TABLE 1

| Adsorbate | Adsorption heat (kcal/mole) | | |
|---|---|---|---|
| | Zeolite 13X | Zeolite 5A | CuCl/alumina |
| Methane ($CH_4$) | 4.4 | 4.6 | 3.1 |
| Carbon dioxide ($CO_2$) | 8.3 | 12.1 | 6.0 |
| Carbon monoxide(CO) | 5.7 | 6.9 | 10.3 |

INDUSTRIAL APPLICABILITY

As described above, the adsorbent of the present invention is advantageous in that a cuprous salt is easily dispersed on a solid material by bringing an aqueous solution containing stabilized cuprous chloride into contact with a porous solid support, and thus this solid material enables the selectivity for carbon monoxide to be improved at the time of selectively adsorbing and separating carbon monoxide in a gas mixture using a pressure swing adsorption (PSA) process, so that the amount of carbon monoxide included in the gas mixture is decreased to infinitesimal quantities, thereby producing high-purity hydrogen products.

Further, the present invention is advantageous in that carbon monoxide can be easily desorbed from an adsorbent merely through a physical operation, for example, increasing the partial pressure of the carbon monoxide adsorbed on the adsorbent or decreasing the temperature thereof, so that the adsorbent can be reused, thereby increasing the lifespan of the adsorbent.

Furthermore, the adsorbent of the present invention can be utilized as an adsorbent which can produce high-purity carbon monoxide products by selectively adsorbing carbon monoxide from a gas mixture containing carbon monoxide and then desorbing the carbon monoxide from the adsorbent.

The invention claimed is:

1. An adsorbent for selectively separating carbon monoxide, comprising a solid material, wherein the solid material is a solid support impregnated and dispersed with a cuprous salt by bringing the solid support into contact with a cuprous salt solution stabilized in a cuprous ion state by dissolving a cuprous salt or a cuprous salt mixture in a solvent and mixing the cuprous salt solution with an additive containing an alkali metal salt.

2. The adsorbent for selectively separating carbon monoxide according to claim 1, wherein the cuprous salt is one selected from the group consisting of cuprous halide, cuprous acetate, and mixture thereof.

3. The adsorbent for selectively separating carbon monoxide according to claim 1, wherein the solvent is one selected from the group consisting of water, ethanol, ethyl acetate, acetone, aqueous ammonia solution, and mixture thereof.

4. The adsorbent for selectively separating carbon monoxide according to claim 1, wherein the solid support is an inorganic material.

5. The adsorbent for selectively separating carbon monoxide according to claim 4, wherein the solid support is one selected from the group consisting of porous alumina, silica, aluminosilicate, and combination thereof.

6. The adsorbent for selectively separating carbon monoxide according to claim 4, wherein the solid support is a porous alumina support.

7. The adsorbent for selectively separating carbon monoxide according to claim 1, wherein the alkali metal salt is one selected from the group consisting of lithium halide, sodium halide, potassium halide, lithium carbonate, sodium carbonate, and potassium carbonate.

8. The adsorbent for selectively separating carbon monoxide according to claim 5, wherein the solid support has a granular, cylindrical or spherical form.

9. The adsorbent for selectively separating carbon monoxide according to claim 8, wherein the solid support has a surface area of 100~1200 $m^2/g$.

10. The adsorbent for selectively separating carbon monoxide according to claim 8, wherein the solid support has an average pore diameter of 10~300 Å.

11. A method of preparing an adsorbent for selectively separating carbon monoxide, comprising: dissolving a cuprous salt or a cuprous salt mixture in a solvent to form a cuprous salt solution; mixing the cuprous salt solution with an additive containing an alkali metal salt to stabilize the cuprous salt solution in a cuprous ion state; and bringing a solid support into contact with the cuprous salt solution containing the additive containing the alkali metal salt to impregnate the solid support with the cuprous salt or cuprous salt mixture.

12. The method of preparing an adsorbent for selectively separating carbon monoxide according to claim 11, further comprising, after the dissolving a cuprous salt in a solvent to form a cuprous salt solution: stirring the cuprous salt solution for 1~8 hours.

13. The method of preparing an adsorbent for selectively separating carbon monoxide according to claim 11, wherein, in the dissolving a cuprous salt in a solvent to form a cuprous salt solution, the cuprous salt is one selected from the group consisting of cuprous halide, cuprous acetate, and mixture thereof.

14. The method of preparing an adsorbent thr selectively separating carbon monoxide according to claim 11, wherein, in the impregnating the solid support with the cuprous salt or cuprous salt mixture, the solid support is formed of alumina, silica or a combination thereof, and comes into contact with the stabilized cuprous salt solution.

15. The method of preparing an adsorbent for selectively separating carbon monoxide according to claim 11, wherein the solid support impregnated with the cuprous salt or cuprous salt mixture is exposed under a nitrogen atmosphere at a temperature of 20~100° C. for at least 2-24 hours.

16. The method of preparing an adsorbent for selectively separating carbon monoxide according to claim 11, wherein the solid support is heat-treated while vaporizing and drying the cuprous salt solution remaining in a state in which it comes into contact with the solid support by heating the cuprous salt solution while purging the nitrogen.

17. The method of preparing an adsorbent for selectively separating carbon monoxide according to claim 16, wherein the heat-treatment of the solid support is performed by heating the solid support in a furnace to a temperature of 80~400° C.

18. The method of preparing an adsorbent for selectively separating carbon monoxide according to claim 16, wherein the heat-treatment of the solid support is performed by purging an inert gas or is performed in a vacuum state.

* * * * *